(12) United States Patent
McGregor et al.

(10) Patent No.: US 12,079,291 B1
(45) Date of Patent: Sep. 3, 2024

(54) APPARATUS FOR ENHANCED OUTREACH AND METHOD OF USE

(71) Applicants: Matt McGregor, Seattle, WA (US); Craig Rosenberg, Shoreline, WA (US)

(72) Inventors: Matt McGregor, Seattle, WA (US); Craig Rosenberg, Shoreline, WA (US)

( * ) Notice: Subject to any disclaimer, the term of this patent is extended or adjusted under 35 U.S.C. 154(b) by 0 days.

(21) Appl. No.: 18/233,372

(22) Filed: Aug. 14, 2023

(51) Int. Cl.
*G06F 16/9535* (2019.01)
*G06F 16/951* (2019.01)
*G06F 16/9538* (2019.01)

(52) U.S. Cl.
CPC ........ *G06F 16/9535* (2019.01); *G06F 16/951* (2019.01); *G06F 16/9538* (2019.01)

(58) Field of Classification Search
CPC ............ G06F 16/9535; G06F 16/9536; G06F 16/9538; G06F 16/951; G06F 16/953; G06F 16/9532
See application file for complete search history.

(56) References Cited

U.S. PATENT DOCUMENTS

| | | | |
|---|---|---|---|
| 9,911,131 B1 * | 3/2018 | Ross | G06Q 30/0201 |
| 11,392,964 B2 | 7/2022 | Gao et al. | |
| 2015/0046215 A1 * | 2/2015 | Crofts | G06Q 30/0201 |
| | | | 705/7.29 |
| 2018/0204226 A1 | 7/2018 | Balasubramanian et al. | |
| 2019/0012697 A1 * | 1/2019 | Nemani | G06N 3/042 |
| 2019/0220875 A1 | 7/2019 | Fatemi | |
| 2021/0049628 A1 | 2/2021 | Baird | |
| 2021/0406933 A1 * | 12/2021 | Carmody | G06Q 30/016 |
| 2022/0180391 A1 * | 6/2022 | Prakash | G06Q 30/0207 |
| 2022/0398609 A1 * | 12/2022 | Feriante | G06Q 30/0201 |

* cited by examiner

*Primary Examiner* — Kris E Mackes
(74) *Attorney, Agent, or Firm* — Caldwell Intellectual Property Law

(57) ABSTRACT

An apparatus for enhanced outreach, the apparatus comprising a computing device configured to receive user data, identify one or more sets of potential data as a function of user data wherein each set of potential data is associated with a potential target, calculate one or more outreach indexes as a function of the one or more sets of potential data comprising, receiving at least one indicator weighting, calculating the one or more outreach indexes as a function of the at least one indicator weighting, sort the one or more sets of potential data as a function of the one or more outreach indexes, determine one or more outreach recommendations as a function of the one or more outreach indexes and the one of more sets of potential data, create a user interface data structure and visually display the user interface data structure as a function of a graphical user interface.

18 Claims, 6 Drawing Sheets

APPARATUS FOR ENHANCED OUTREACH AND METHOD OF USE

FIELD OF THE INVENTION

The present invention generally relates to the field of optimized enhanced outreach. In particular, the present invention is directed to an apparatus for enhanced outreach and method of use.

BACKGROUND

In general, entities may have protocols and approaches in place for communication and outreach. However, current protocols for recommending outreach targets do not adequately take user specific data into account and instead provide for more generic approaches.

SUMMARY OF THE DISCLOSURE

In an aspect, an apparatus for enhanced outreach is described. Apparatus includes a processor and a memory communicatively connected to the at least a processor. The memory contains instructions configuring the at least a processor to receive user data, identify one or more sets of potential data as a function of user data, wherein each set of potential data of the one or more sets of potential data is associated with a potential target, and calculate one or more outreach indexes as a function of the one or more sets of potential data including receiving at least one indicator weighting associated with at least one element within the one or more sets of potential data and calculating the one or more outreach indexes as a function of the at least one indicator weighting. The processor is further configured to sort the one or more sets of potential data as a function of the one or more outreach indexes, determine one or more outreach recommendations as a function of the one or more outreach indexes and the one of more sets of potential data, create a user interface data structure, wherein the user interface data structure includes the one or more outreach recommendations, transmit the user interface data structure to a graphical user interface, and visually present the user interface data structure as a function of the graphical user interface.

In another aspect, a method for enhanced outreach is described. The method includes a method for enhanced outreach, the method comprising receiving, by at least a processor, user data, identifying, by the at least a processor, one or more sets of potential data as function of user data, wherein each set of the one or more sets is associated with a potential target, and calculating, by the at least a processor, an outreach index as a function of the potential data including receiving an indicator weighting associated with at least one element within the one or more sets of potential data, and calculating the one or more outreach indexes as a function of the at least one indicator weighting. The method further includes sorting, by the at least a processor, the one or more sets of potential data as a function of the one or more outreach indexes, determining, by the at least a processor, one or more outreach recommendations as a function of the one or more outreach indexes and the one or more sets of potential data, creating, by the at least a processor, a user interface data structure, wherein the user interface data structure includes the one or more outreach recommendations, transmitting, by the at least a processor, the user interface data structure to a graphical user interface, and visually presenting. by the at least a processor, the user interface data structure as a function of the graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for enhanced outreach. Apparatus may include a memory, a processor, and a graphical user interface. Apparatus may be used to determine an outreach index and outreach recommendations.

Aspects of the present disclosure can be used to create enhanced outreach and determine the adequate time to initiate a communication with another individual, company, or entity. Exemplary embodiments illustrating aspects of the present disclosure are described below in the context of several specific examples.

Figure 1:
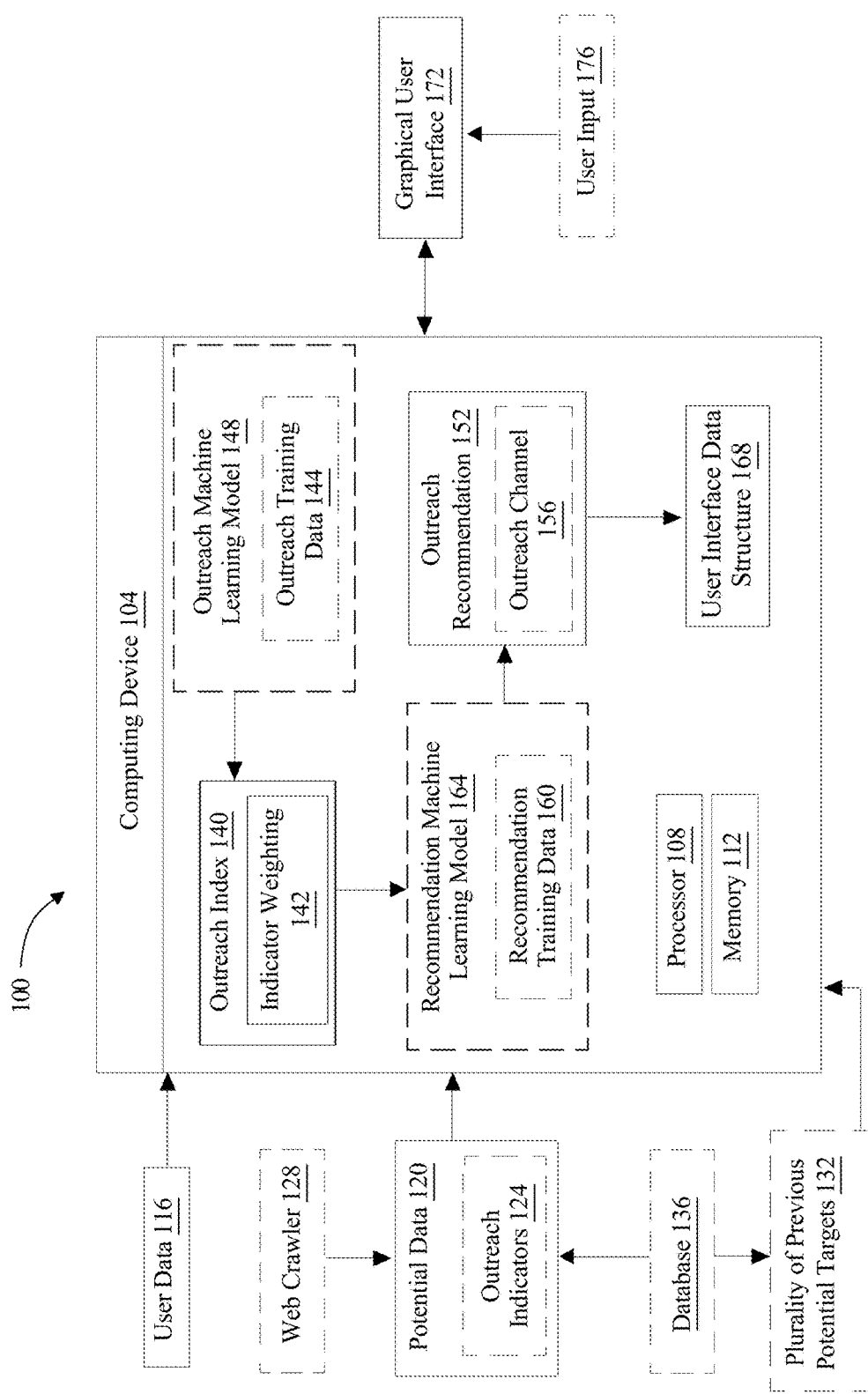
FIG. 1 is a block diagram of an exemplary embodiment of an apparatus for enhanced outreach.

Referring now to FIG. 1, an exemplary embodiment of an apparatus 100 for enhanced outreach is illustrated. Apparatus 100 includes a computing device 104. Apparatus 100 includes a processor 108. Processor 108 may include, without limitation, any processor 108 described in this disclosure. Processor 108 may be included in a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices may be included together in a single computing device 104 or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. computing device 104 may include but is not limited to, for example, a computing device 104 or cluster of computing devices in a first location and a second computing device 104 or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor 108 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be combined, subdivided, shared, or otherwise handled using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 108 module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 contains instructions configuring processor 108 to receive user data 116. "User data" for the purposes of this disclosure is any data referring to and/or associated with a user. "User" for the purposes of this disclosure is a person or entity seeking enhanced outreach. User may include an employee seeking to reach out to potential targets. In some cases, user may include an entity, such as a business, seeking to reach out to current or potential prospects. In some cases, user may include an ordinary person seeking to enhance their communication. "Enhanced outreach" for the purposes of this disclosure is communication that is performed under circumstances that may provide a favorable result. For example, enhanced outreach may include communicating with another user while they are in a good mood, wherein the good mood may cause a beneficial result. In some cases, enhanced outreach may include communication during a time of need for a user, wherein the user may seek to benefit from the communication.

With continued reference to FIG. 1, user data 116 may include any data relating to a user. User data 116 may include data such as field of employment, the business or entity user is associated with (e.g., real estate, cash advance, legal, etc.) financial history, the type of targets sought, goals sought, the number of employees and the like. User data 116 may further include basic information, such as and without limitations, age, gender, marital and/or family status, location, previous work history, previous education history, awards, achievements, and the like. User data 116 may further include targets a user may seek to communicate with. In some cases, user data 116 may further include user goals. "User goals" for the purposes of this disclosure is on or more goals in which a user seeks to accomplish. This may include reaching out to five targets a week, signing five new deals a week, increasing their salary, the type of targets that are sought (e.g. company, field of practice, the role of the target and the like) and the like. In some cases, user data 116 may include a user objective. "User objective" for the purposes of this disclosure is the potential target that a user is seeking to communicate with, the field of potential targets that a user is seeking to communicate with or a particular issue that groups a particular set of people. For example, user objective may include an objective such as middle-class families, companies on the verge of bankruptcy, technology companies, and the like.

With continued reference to FIG. 1, user data 116 may be received through an input device. In some instances, input device may be included in apparatus 100. In some instances, input device may include a remote device. In instances where user data 116 is input into a remote input device, remote device may transmit user data 116 across a wireless connection. In some embodiments, wireless connection may be any suitable connection (e. g., radio, cellular). In some instances, input device may include a computer, laptop, smart phone, tablet, PDA, or things of the like. In some instances, user data 116 may be stored in a data store and associated with a user account. It should be noted that data store may be accessed by any input device, using authorization credentials associated with user data 116. In some instances, user data 116 may be created and stored via a laptop and accessed from tablet, using authorization credentials. In some cases, user data 116 may be stored in a storage and retrieved from storage. In some cases, user data 116 may be received from user data 116 inputted on a previous iteration. In some cases, user data 116 may be stored on a storage for use in a future iteration.

With continued reference to FIG. 1, memory 112 contains instructions configuring processor 108 to identify one or more sets of potential data 120 wherein each set of potential data 120 of the one or more sets of potential data 120 is associated with a potential target. "Potential target" for the purposes of this disclosure is a person or entity in which user seeks to have enhanced outreach with. Potential target may include a potential customer, a potential business target, a potential partner, an entity, a potential client, a person in which user may seek to have interactions with and the like. "Potential data" for the purposes of this disclosure is any data relating to the potential target. Potential data 120 may include data such as the field of the target (law, agriculture, education, real-estate, etc.) the financial history of the target (cash flow, bankruptcy issues, profits, losses, etc.), the business structure of the target (e.g., the amount of employees, amount of managers, strategic advantages, etc.), the employee satisfaction of the target (e.g., turnover rates, employees fired, employee salary, etc.), and the like. In some cases, potential data may further include information entity data. "Entity data," for the purposes of this disclosure, is any information relating to an entity. As used in the current disclosure, an "entity" is an organization comprised of one or more persons with a specific purpose. An entity may include a corporation, organization, government, business, group of one or more persons, and the like. Entity data may include any information associated with an entity. This may include but is not limited to, information associated with financials (e.g., net worth, net profit, gross profit, revenues, dividends, products or services sold and the like), information associated with employees (e.g., employee satisfaction, employee turnover, employee information, employee salaries, and the like), information associated with mergers and acquisitions associated with the entity, information containing recent news about the entity, and the like. Potential data 120 may further include data associated with a particular target at a business. For example, potential data 120 may include basic information of an employee such as any data described above in user data 116. Potential data 120 may further include outreach indicators 124. "Outreach indicators" for the purposes of this disclosure is data that may be dispositive on whether a potential target should be communicated with. For example, a significant event associated with a target may be an outreach indicator as the target may need assistance. Outreach indicators 124 may include data such as job changes and job title changes within a specific company, and the specific identity of the employee. Outreach indicators 124 may further include changes within the company related with news, changes within the industry associated with potential target, mergers and acquisitions associated with potential target, 10 k report narratives and directions, quarterly reports and changes in 10 k report and other company specific reports, changes with competition and competitive companies, and/or changes and/or news with major items that would affect the company (e.g. the cost of warehousing for Amazon or the cost of a commodity that a specific company would be using in high volume). Outreach indicator may further include future forecasts that may affect potential target. This may include forecasts in the economy, forecasts in the price of goods, or any other forecasts that may directly or indirectly affect target. Outreach indicators 124 may further include any actions to events associated with a potential target and the dates of those events. For example, potential data 120 may indicate the potential target hired 20 employees 3 months ago and hired another 20 one month ago. Similarly potential data 120 may indicate that a potential target filed for bankruptcy 20 years ago but has been doing well financially over the past year. Outreach indicators 124 may contain a plurality of indicators wherein each indicator is a singular action or event and a data associated with the singular action or event. For example, indicator may include a singular event of hiring an employee on a specific date wherein outreach indicators 124 may include multiple indicators such as filing for bankruptcy, hiring employees and the like.

With continued reference to FIG. 1, computing device 104 may identify particular outreach indicators 124 within potential data 120. For example, computing device 104 may determine that a particular action or event within potential data 120 may be identified as a potential outreach indicator. In some cases, computing device 104 may identify keywords within potential data wherein the presence of a keyword or a string word may be dispositive of an action or event that may be associated with an outreach indicator 124. For example, a keyword such as 'mortgage' 'small business loan' or 'bankruptcy' within potential data 120 may be selected and inputted into outreach indicators 124. Computing device 104 may then further determine the potential outreach of the target further on in the processing as described below. In some cases, potential data 120 may be classified to an outreach class. An "Outreach class" for the purposes of this disclosure is a grouping of elements within potential data 120. Outreach class may include backgrounds, outreach indexes actions, events, field of profession and the like wherein computing device 120 may select only those labels associated with outreach indicators 124 in order to identify outreach indicators 124 within potential data 120. For example, computing device may select any elements within potential 120 having a label of 'outreach index' wherein the elements labeled outreach index may be identified as outreach indictors 124. Classifiers will be described in further detail in this disclosure. In some cases, the computing device or devices may utilize a machine learning model as described in this disclosure to identify outreach indicators 124 within potential data. In some cases training data may include a plurality of potential 120 correlated to a plurality of outreach indicators, wherein machine learning model is trained with the training data and potential data is identified as a function of the machine learning model. Training data may be generated and/or received in any way described within this disclosure.

With continued reference to FIG. 1, identifying potential data 120 may include receiving potential data 120 from a user. User may input potential data 120 into computing device 104. In some cases potential data 120 may be identified using a web crawler 128. A "web crawler" as used herein, is a program that systematically browses the internet for the purpose of Web indexing. The web crawler 128 may be seeded with platform URLs, wherein the crawler may then visit the next related URL, retrieve the content, index the content, and/or measures the relevance of the content to the topic of interest. The web crawler 128 may be seeded and/or trained with a reputable website, such as linkedin.com, to begin the search. A web crawler 128 may be generated by a processor 108. In some embodiments, the web crawler 128 may be trained with information received from an external user through a user interface. In some embodiments, the web crawler 128 may be configured to generate a web query. A web query may include search criteria received from a user. For example, a user may submit a plurality of websites for the web crawler 128 to search to user data 116 statistics from and correlate to pecuniary user data 116, educational user data 116, social user data 116, and the like. Additionally, the web crawler 128 function may be configured to search for and/or detect one or more data patterns. A "data pattern" as used in this disclosure is any repeating forms of information. A data pattern may include repeating pecuniary strategies, similar targets, educational strategies, and the like. In some embodiments, the web crawler 128 may be configured to determine the relevancy of a data pattern. Relevancy may be determined by a relevancy score. A relevancy score may be automatically generated by processor 108, received from a machine learning model, and/or received from the user. In some embodiments, a relevancy score may include a range of numerical values that may correspond to a relevancy strength of data received from a web crawler 128 function. As a non-limiting example, a web crawler 128 function may search the Internet for potential data 120 related to an external user. The web crawler 128 may return potential data 120, such as, as non-limiting examples, a user's educational data, investment data, pecuniary data, crime data, and the like. In some cases, web crawler 128 may parse through data on news websites, social media websites, and any other websites that may be relevant to potential data 120.

With continued reference to FIG. 1, identifying potential data 120 associated with a potential target may further include identifying potential data 120 as a function of user data 116. In an embodiment, computing device 104 may receive user data 116 and determine a potential target as a function of user data 116. For example, user data 116 may already indicate a potential target, wherein computing device 104 may receive the potential target and generate potential data 120. Potential data 120 may be generated in any as described in this disclosure. In some cases, identifying potential data 120 associated with a potential target may include identifying potential data 120 using a target machine learning model.

With continued reference to FIG. 1, processor 108 may use a machine learning module, such as a target machine learning module for the purposes of this disclosure, to implement one or more algorithms or generate one or more machine-learning models, such as a target machine learning model, to identify at least one potential target and/or potential data 120. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. Exemplary inputs and outputs may come from a database 136, such as any database 136 described in this disclosure, or be provided by a user. In other embodiments, a machine-learning module may obtain a training set by querying a communicatively connected database 136 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that the entry of a given data element in a given field in a form may be mapped to one or more descriptors of categories. Elements in training data may be linked to descriptors of categories by tags, tokens, or other data elements. A machine learning module, such as target machine learning module, may be used to generate target machine learning model and/or any other machine learning model using training data. target machine learning model may be trained by correlated inputs and outputs of training data. Training data may be data sets that have already been converted from raw data whether manually, by machine, or any other method. Target training data may be stored in a database 136. Target training data may also be retrieved from database 136.

Still referring to FIG. 1, database 136 may be implemented, without limitation, as a relational database, a key-value retrieval database such as a NOSQL database, or any other format or structure for use as a database 136 that a person skilled in the art would recognize as suitable upon review of the entirety of this disclosure. Database 136 may alternatively or additionally be implemented using a distributed data storage protocol and/or data structure, such as a distributed hash table or the like. Database 136 may include a plurality of data entries and/or records as described above. Data entries in database 136 may be flagged with or linked to one or more additional elements of information, which may be reflected in data entry cells and/or in linked tables such as tables related by one or more indices in a relational database 136. Persons skilled in the art, upon reviewing the entirety of this disclosure, will be aware of various ways in which data entries in a database 136 may store, retrieve, organize, and/or reflect data and/or records.

With continued reference to FIG. 1, identifying potential data 120 as a function of user data 116 may include receiving target training data. In an embodiment, target a plurality of user data 116 correlated to a plurality of potential data 120. For example, target training data may be used to show a particular user data 116 is correlated to one of a plurality of potential data 120. In some cases, target training data may include a plurality of user data 116 correlated to a plurality of target lists, wherein "target lists" may include a list of potential targets. Computing device 104 may then generate potential data 120 based on the target lists by using a web crawler 128. In some embodiments, target training data may be received from a user, third party, database 136, external computing devices, previous iterations of processing, and/or the like as described in this disclosure. Target training data may further be comprised of previous iterations of user data 116 and/or potential data 120. Target training data may be stored in a database 136 and/or retrieved from a database 136. Identifying potential data 120 may further include training a target machine learning model as a function of target training data and identifying potential data 120 as a function of target machine learning model. In some cases, target training data may be trained through user input wherein a user input may determine if potential data 120 is accurate and/or applicable to the current user data 116. In some cases, potential data 120 may be generated using a lookup table. Processor 108 may be configured to lookup up particular potential data 120 based on a user goal or. User objective. For example, a particular user objective may be associated with a particular set of targets as indicated by potential data 120. For example, user objective containing "technology companies" may be associated with elements on a lookup table having potential targets for technology companies. Lookup table includes any lookup table as described in this disclosure.

With continued reference to FIG. 1, identifying potential data 120 may further include receiving a plurality of previous potential targets 132 from a database 136. "Plurality of previous potential targets" for the purposes of this disclosure is targets that a user or someone associated with user may have interacted with or done business with on a previous data or previous iteration. Plurality of previous potential targets 132 may include a plurality of potential data 120 received by computing device 104 on previous iterations wherein computing device 104 stored the previous potential data 120 on a database 136 and/or a storage. In some cases, potential data 120 of the current iteration may be stored on database 136. Plurality of previous potential targets 132 may further include a plurality or potential targets inserted by a user on a current or previous iteration. In some cases, plurality of previous potential targets 132 may include a plurality of potential data 120 received by computing device 104 form multiple users with similar association. Users with similar association may include employees within a company, partners, or any other users that agree to share information with one another. Computing device 104 may receive potential data 120 from multiple iterations and multiple users and store them on a database 136. In some cases, a plurality of previous potential targets 132 may be generated by computing device 104, wherein computing device 104 may utilize web crawler 128 described above to scrape websites for potential targets. Computing device 104 may identify objective websites, such as linkedin.com, in order to find individuals within a particular field. Computing device 104 may scrape users that may be associated with user data 116, such as, for example, scraping data of users associated to the real estate industry. Computing device 104 may receive potential targets and sort the targets by keywords and the like in order to find potential targets. Computing device 104 may then input the potential targets into a plurality of previous potential targets 132. In some cases, a plurality of previous potential targets 132 may include a wide variety of potential targets that are not associated to a particular category or group. For example, computing device 104 may scrape the internet for any business or any individual within a particular set of parameters (e.g., anyone with a bachelor's degree, anyone over the age of 20, anyone with the title 'CEO' on their profile, and the like). In some cases, a plurality of previous potential targets 132 may include businesses or targets mentioned within a particular news article (e.g., Wall Street Journal, Bloomberg Business, etc.). A plurality of previous potential targets 132 may then include a plurality of targets that may be utilized with a vast amount of fields.

With continued reference to FIG. 1, identifying potential data 120 may further include classifying the plurality of previous potential targets 132 to a field class. Additionally, or alternatively, processor 108 may classify the plurality of previous potential targets 132, using a machine learning model, such as a classifier, to organize the field classes. As used in this disclosure, a "field class" is a grouping of a plurality of previous potential targets 132 based on the particular issue and/or industry that each target may be associated with. As a non-limiting example, field classes may include a technology field, a law field, a bankruptcy issue, a tax filing issue, and the like. In some cases, field classes may be grouped into categories that may be available within the user objective described above. For example, field classes may include groupings such as middle-class families, users looking for a house, current homeowners, small businesses, and the like. A field classifier may be used to label various data present within the plurality of previous potential targets 132. For example, data within a plurality of previous potential targets 132 indicating that a target such as an entity is on the verge of bankruptcy may be labeled with a 'bankruptcy' label. In another non-limiting example, data within a plurality of previous potential targets 132 indicating that a particular target is a current homeowner may be labeled with a 'homeowner' label. A "classifier," as used in this disclosure, is a machine-learning model, such as a mathematical model, neural net, or program generated by a machine-learning algorithm known as a "classification algorithm," as described in further detail below, that sorts inputs into categories or bins of data, outputting the categories or bins of data and/or labels associated therewith. Classifiers, as described throughout this disclosure, may be configured to output at least a datum that labels or otherwise identifies a set of data that are clustered together, found to be close under a distance metric as described below, or the like. For example, Processor 108 may generate and train a field classifier configured to receive plurality of previous potential targets 132 and output at least a field class. Processor 108 and/or another device may generate a classifier using a classification algorithm, defined as a process whereby a processor 108 derives a classifier from training data. In some cases, field classifier may use data to prioritize the order of labels within plurality of previous potential targets 132. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, neural network-based classifiers, or any other appropriate method. A field classifier may be trained with training data correlating plurality of previous potential targets 132 to field groupings, such as, homeowners, small businesses, technology companies, small businesses and the like. Training data may be received from an external computing device 104, user input, and/or previous iterations of processing. A field classifier may be configured to input plurality of previous potential targets 132 and categorize components of plurality of previous potential targets 132 to one or more field groupings. Data classified in this disclosure may further be classified using fuzzy sets as described below. Fuzzy sets may be useful where data may fit into different categories and/or classes, or where data may be borderline in a category.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 136, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, identifying potential data 120 may further include identifying potential data 120 as a function of classifying the plurality of previous potential targets 132. Computing device 104 may select groupings classified by field classifier that may be associated with user data 116, user goal, and/or user objective. For example, computing device 104 may select groupings related to homeowners wherein the user objective may indicate that a user is trying to communicate with current homeowners. Similarly, computing device 104 may select groupings related to bankruptcy, wherein user data 116 may indicate that a user is trying to communicate with targets on the verge of bankruptcy or has recently filed for bankruptcy. In an embodiment, a field classifier may be used to generate potential data 120 of potential targets for a user wherein a user may receive potential targets without having to manually search for them. Computing device 104 may select particular groupings within the field class to be used as potential data 120.

With continued reference to FIG. 1, memory 112 further contains instructions configuring processor 108 to calculate one or more outreach indexes 140 as a function of potential data 120. "Outreach index" for the purposes of this disclosure is data containing whether a potential target should be communicated with. For example, outreach index 140 may contain data indicating that for the next month, the target should not be contacted. Continuing, computing device 104 may determine that a potential target has recently lost a loved one, and as a result, any communications with the target may hinder a current or potential relationship. Outreach index 140 may include a score indicating whether a potential target should be communicated with. For example, A lower score of 1 may indicate that the target should not be contacted, whereas a score of 4 may indicate that the target should be contacted. In some cases, outreach index 140 may include a score of 1-100, wherein 1 might signify that it is a bad time to communicate with the target whereas a score of 78 may indicate that is somewhat of a good time to communicate with the target. One of skill in the art would understand that the upper and lower range of values can be between any two numbers, and does not need to be between 1 and 100 that is used in this example. In some cases, outreach index 140 may include more than one scores wherein each score may be associated with a user objective. For example, a user objective containing information about a particular target about refinancing may have a score of 80/100 (80 out of 100), indicating that the target is in a good position to be contacted about financing, whereas an objective about hiring more employees may have a score of 20/100 (20 out of 100) indicating that it is not a good time to call about employee hiring or firing. In some cases, outreach index 140 may include indicator weightings 142, wherein each indicator weighting 142 is associated with a particular indicator within outreach indicators 124. "Indicator weighting" 142, for the purposes of this disclosure, is a numerical score associated with one or more elements or indicators within potential data 120. For example, outreach index 140 may contain an indicator weighting 142 of 20 for an indicator describing employment changes within a company and an indicator weighting of 80 for mergers and acquisitions. In some cases, each element within potential data may be associated with a corresponding indicator weighting 142. In some cases, each indicator weighting 142 is associated with at least one element within one or more sets of potential data 120. Outreach index 140 may further contain a singular weighted score calculated as a function of the indicator weightings 142 wherein the singular weighted score is a sum of the indicator weightings. For example, outreach index 140 may contain a singular weighted score of 90, indicating that it is a good time to call target, wherein the score of 90 is calculated based on a sum of the indicator weightings 142. In some cases, an outreach index 140 may contain a score as a function of time, wherein the passage of time may create a higher or lower outreach index 140. For example, outreach index 140 may contain a score of 80 if the user calls on the first day and a score of 15 if the user calls on the 20$^{th}$ day. In an embodiment, computing device 104 may determine that a particular amount of time passed may increase or decrease the score. For example, a user contacting a target a day after the loss of a loved one associated with target may indicate a lower score, whereas a passage of 30 days may create a high outreach index 140 score.

With continued reference to FIG. 1, calculating outreach index 140 may include using a lookup table wherein each outreach indicator 124 may be associated with a particular indicator weighting 142. For example, a target hiring new employees may be associated with a score of 70, and a target firing employees may be associated with a score of 20. Continuing, a target filing for bankruptcy may indicate an indicator weighting 142 of 20, whereas a target spending money may indicate an indicator weighting 142 of 80. Outreach index 140 may contain a score based on the sum of the indicator weightings 142. In some cases, calculating the outreach index may include calculating the outreach index for each set of potential data 120. For example, a first potential data 120 may include a first score, and a second potential data may include a second score. In some cases, processor 108 may be configured to sum up and/or average the indicator weightings 142 associated with the elements within potential data 120 using an arithmetic logic unit within computing device. In some cases, each element within potential data may be associated with a different indicator weighting 142. For example, a first element may include a weighting of 4 whereas a second element may include a weighting of 10. In some cases, each element within potential data 120 may contain a different impact in determining an outreach index and, as a result, may contain a differing weighting in comparison to other elements. The various outreach indexes may then be combined in some way such as averaging the results or calculating a weighted average from the various outreach indicators.

Additionally, or alternatively, processor 108 is configured to sort one or more sets of potential data 120 as a function of the scores. In some cases, processor 108 may be configured to generate a list of one or more outreach indexes 140 and store the one or more outreach indexes 140 on database 136. In some cases, processor 108 may be configured to sort the list in ascending or descending order. For example, processor 108 may be configured to sort a list wherein the first outreach index 140 contains the highest score and the last outreach index 140 contains the lowest score. In some cases, potential data 120 may be sorted based on their associated outreach indexes, wherein a first potential data 120 may be associated with a higher outreach index 140, and a last potential data 120 within the list may be associated with a lower outreach index 140. In some cases, processor 108 may be configured to create a data structure comprising one or more potential data 120 and their corresponding outreach index 140. In some cases, the data structure may be sorted in descending order, wherein potential data 120, associated with the highest outreach index 140, may be placed at the top of a list within the data structure. In some cases, sorting may include comparing each outreach index 140 to a predetermined threshold wherein the process may be configured to select and/or present potential data associated with an outreach index 140 above the predetermined threshold. For example, processor 108 may be configured to determine which outreach index 124 falls above a predetermined threshold and select only those particular potential data 120 associated with those outreach indexes 140 that meet the threshold criteria.

With continued reference to FIG. 1, calculating outreach index 140 as a function of potential data 120 may include calculating outreach index 140 using a machine learning model. Additionally or alternatively, receiving the indicator weightings 142 may include receiving the indicator weightings 142 using a machine learning model. Calculating outreach index 140 and/or receiving the indicator weightings 142 includes receiving outreach training data 144 comprising a plurality of potential data 120 correlated to a plurality of outreach indexes 140. In an embodiment, a particular potential data 120 may indicate a particular outreach index 140. In some cases, outreach training data 144 may include a plurality of outreach indicators 124 correlated to a plurality of indicator weightings 142. In an embodiment, each outreach indicator may be correlated to an indicator weighting 142, wherein outreach index 140 may contain a sum and/or average of the outreach indicators 124. In some embodiments, outreach training data 144 may be received from a user, third party, database 136, external computing devices, previous iterations of processing, and/or the like as described in this disclosure. Outreach training data 144 may further be comprised of previous iterations of potential data 120 and outreach index 140. Outreach training data 144 may be stored in a database 136 and/or retrieved from a database 136. Calculating outreach index 140 further includes training an outreach machine learning model 148 as a function of outreach training data 144 and calculating outreach index 140 as a function of outreach machine learning model 148. In some cases, outreach training data 144 may be trained through user input, wherein a user input may determine if outreach index 140 data is accurate and/or applicable to the current potential data 120. In some cases, training outreach machine learning model 148 as a function of potential data 120 comprises receiving user input as a function of the outreach index 140. For example, computing device 104 may receive feedback from a user asking the user to rate the conversation. Users may input data such as the quality of the conversation, wherein the rating may be used to determine a particular rating associated with particular potential data 120. For example, computing device 104 may determine an outreach index 140 of 5 for a particular potential data 120. However, users may communicate with a potential target and determine that outreach index 140 should have been a 3. As a result, outreach machine learning model 148 may be trained for future iterations. In some cases, users may input indicator weightings 142 such that computing device 104 may determine what particular outreach indicator was the cause of the change in score. For example, the user may input that a particular indicator was the deciding factor in the communication, wherein outreach index 140 may now contain updated weighted averages to account for the particular indicator. User input may include any user input as described within this disclosure. In some cases, the processor is further configured to train outreach machine learning model 148 as a function of outreach training data 144. Additionally, or alternatively, processor may be configured to calculate an outreach index 140 as a function of the outreach machine learning model. Additionally, or alternatively, the processor is configured to receive one or more indicator weightings 142 as a function of the outreach machine learning model wherein processor 108 may be configured to calculate outreach index 140 as a function of the indicator weightings 142.

With continued reference to FIG. 1, memory 112 further contains instructions configuring processor 108 to determine an outreach recommendation 152 as a function of the outreach index 140 and potential data 120. "Outreach recommendation" for the purposes of this disclosure is suggestions and/or instructions instructing a user on how to communicate to a target. In some cases, outreach recommendation 152 includes an outreach channel 156. "Outreach channel," for the purposes of this disclosure, is the suggested mode of communication with a particular potential target. For example, outreach recommendation 152 and/or outreach channel 156 may include suggestions letting a user know that for this particular target, text-based messages are preferred while phone calls and/or video calls may not be preferred by the target. In some cases, processor 108 may determine that a particular target is a certain age or falls within a particular category, wherein processor 108 may determine that a preferred method of outreach may be preferred. For example, processor 108 may recommend texting as a form of communication for a younger target, whereas calling may be the preferred mode of communication for older targets. The processor or processors may use a classifier as described in this disclosure to classify targets into outreach categories wherein each category may indicate a particular preference for communication (e.g., voice call, text message, video call, fax, email, social media message, etc.) In some cases, the age of the target may indicate a particular preference wherein a particular range of ages may indicate a particular outreach channel 156. In some cases processor 108 may classify potential data to demographic class. A "demographic class" for the purposes of this disclosure is a grouping of potential data based on the personal background of a target. For example, demographic class may include gender, age, ethnicity, religious background and the like. In some cases demographic class may include multiple groupings for a particular demographic such as, for example, an old age group, a young age, group, a millennial age group, a generation X age group and the like. A classifier may be used to label potential data or various elements within potential data to determine the particular demographic of a particular target. For example, data indicating that a potential target is young may cause potential data to be labeled as 'young demographic'. As a result, processor 108 and/or computing device 104 may determine that a particular outreach channel 156 is recommended. Classifying potential data to a demographic class may include using a classifier, a machine learning model, and the like described in this disclosure. In some cases, processor 108 'lookup' particular outreach channels that may be associated with each label. For example, a label having a 'young demographic' may be associated with an outreach channel indicating that a target should be texted rather than called. Each label within the demographic classes may be associated with a particular outreach channel 156 on a lookup table wherein the processor may determine the particular outreach channel 156 based on the label.

With continued reference to FIG. 1, outreach recommendation 152 may further contain a suggestive script to send to the target or to read to the target over the phone. Outreach recommendation 152 may contain suggestions that are specific to a target's background, such as their age, their gender, their role in a business, their online activity, and the like. computing device 104 may use potential data 120 to determine what statements to make and how to make them. For example, outreach recommendation 152 may include a statement describing a user's happiness that the targets company grew over the past year. This suggestive statement may make the target more likely to engage in communication and business with the user. In some cases, outreach recommendation 152 may include disadvise statements. "Disadvise statements" for the purposes of this disclosure are statements that a user should not make when communicating with target. For example, disadvise statement may include a statement informing user not to mention the recent financial hardships suffered by target. In some cases, outreach recommendation 152 may include more than one recommendation wherein each recommendation may be a differing suggestive statement. For example, each recommendation may include a statement emphasizing differing matters wherein a user may choose the specific recommendation that may seem to fit. In some cases, outreach recommendation 152 may include more than one recommendations wherein each recommendation is based on the form of communication that will be used. For example, a specific recommendation may be given for phone conversation, while another recommendation may be given for a message sent on a social media website such as linkedin.com. In some cases, outreach recommendation 152 may include recommendation scores wherein each recommendation is associated with a particular score. For example, a first recommendation suggesting to the user to send a particular statement through LinkedIn may contain a score of 90, wherein the score may indicate that the preferred mode of communication and the following statement is preferred. In contrast, outreach recommendation 152 may contain a second recommendation using a phone as the mode of communication and a following suggestive statement to make over the phone having a score of 30, wherein the score may indicate that the mode of communication is not recommended. In some cases, outreach recommendation 152 may contain statements or suggestions to make based on potential data 120, such as, for example, recent events in the news, recent actions associated with target, recent actions that promoted contact with target, and the like. In some cases, outreach recommendation 152 may include a list of bullet points that a user may address when communicating with the target. The bullet points may include recent significant events associated with the target that should or should not be addressed. In some cases, outreach recommendation 152 may include suggestions based on outreach index 140, wherein each indicator weighting 142 may indicate the communication of a particular indicator within outreach indicators 124. For example, an indicator weighting 142 of 20 associated with a particular indicator may be suggestive that a target should not address a particular topic or event. In some cases, outreach recommendation 152 may include a plurality of modes of communication that a user may choose from wherein each mode of communication may contain one or more suggestions. In additions each mode of communication may contain a score indicating the best form of communication and each suggestion within the form of communication may contain a score as well. In some cases, a user may choose to neglect recommended scores based on intuition or based on an assumption that the scores generated may not be accurate for the particular target. Users may choose a specific mode of communication and a specific communication and update computing device 104 as to whether to score was correct or not.

With continued reference to FIG. 1, computing device 104 may determine an outreach recommendation 152 using data present within the outreach index 140 and potential data 120. For example, potential data 120 indicating a significant event, and a low score associated with the event may signify that a user should not discuss a particular topic. As a result, computing device 104 may generate an outreach recommendation 152 indicating to a user not to discuss a particular topic. In some cases, computing device 104 may use a lookup table wherein a particular indicator associated with a particular score may contain a particular suggestion. For example, an indicator within outreach indicators 124 having an associated indicator weighting 142 of 70 may be looked up in a look up table to find suggestions that are associated with the indicator and score. In some cases, computing device 104 may use a lookup table using outreach index 140 and the field of a target within potential data 120 in order to look up what suggestions may be given for a particular target having a specific score within a specific field. For example, computing device 104 may look up and output suggestions for a target having an outreach index 140 of 60 within the technology field.

With continued reference to FIG. 1, determining an outreach recommendation 152 as a function of the outreach index 140 and potential data 120 may include determining an outreach recommendation 152 using a machine learning model. Determining an outreach recommendation 152 may include receiving recommendation training data 160 comprising a plurality of potential data 120 and a plurality of outreach indexes correlated to a plurality of outreach recommendations. In an embodiment, a particular potential data 120 and an associated outreach index 140 may indicate a particular outreach recommendation 152. In some cases, recommendation training data 160 may include a plurality of outreach indicators 124 and a plurality of associated indicator weightings 142 correlated to a plurality of outreach recommendations. In an embodiment, each outreach indicator and associated score may be correlated to a particular suggestion within outreach recommendations. In some embodiments, recommendation training data 160 may be received from a user, third party, database 136, external computing devices, previous iterations of processing, and/or the like as described in this disclosure. Recommendation training data 160 may further be comprised of previous iterations of potential data 120, outreach indexes and outreach recommendations. Recommendation training data 160 may be stored in a database 136 and/or retrieved from a database 136. Calculating outreach recommendation 152 may further include training a recommendation machine learning model 164 as a function of recommendation training data 160 and calculating outreach recommendation 152 as a function of recommendation machine learning model 164. In some cases, recommendation training data 160 may be trained through user input wherein a user input may determine if outreach recommendation 152 data is accurate and/or applicable to the current target. In some cases, training recommendation machine learning model 164 as a function of potential data 120 and outreach index 140 may include receiving user input as a function of the outreach recommendation 152. For example, computing device 104 may receive feedback from a user asking the user to rate the conversation. Users may input data such as the quality of the conversation, wherein the rating may be used to determine a particular recommendation that was given for the conversation. For example, computing device 104 may determine that a particular suggestion within outreach recommendation 152 should be given, whereas a user may input that the suggestion did not aid in communications with the target. As a result, recommendation machine learning model 164 may be trained for future iterations.

With continued reference to FIG. 1, memory 112 may further contain instructions configuring processor 108 to create a user interface data structure 168. As used in this disclosure, "user interface data structure" is a data structure representing a specialized formatting of data on a computer configured such that the information can be effectively presented for a user interface. User interface data structure 168 includes outreach recommendation 152. In some cases, user interface data structure 168 further includes any data as described in this disclosure, such as user data 116, potential data 120, outreach index 140, outreach recommendations 152, and the like. Additionally, or alternatively, processor 108 may be configured to generate user interface data structure 168 using any combination of data as described in this disclosure With continued reference to FIG. 1, memory 112 further contains instructions to transmit user interface data structure 168. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, optical, and microwave data and/or signals, combinations thereof, and the like, among others. Processor 108 may transmit the data described above to a database 136 wherein the data may be accessed from a database 136, processor 108 may further transmit the data above to a device display or another computing device 104.

With continued reference to FIG. 1, apparatus 100 further includes a graphical user interface (GUI) 172. For the purposes of this disclosure, a "user interface" is a means by which a user and a computer system interact; for example, through the use of input devices and software. A user interface may include a graphical user interface, command line interface (CLI), menu-driven user interface, touch user interface, voice user interface (VUI), gesture-based interface, neural interface, and/or any combination thereof, and the like. In some embodiments, a user may interact with the user interface using a computing device 104 distinct from and communicatively connected to at least a processor 108. For example, a smartphone, smart, tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations on. In some embodiments, GUI 172 may include icons, menus, other visual indicators, or representations (graphics), and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages, and the like may be represented using a small picture in a graphical user interface. Persons skilled in the art, upon reviewing the entirety of this disclosure, will be aware of the many various ways in which a graphical user interface and/or elements thereof may be implemented and/or used as described in this disclosure.

With continued reference to FIG. 1, GUI 172 is configured to receive the user interface structure and visually present at least one or more outreach recommendations 152 as a function of the user interface data structure 168. In some cases, GUI 172 may be displayed on a display device. The display device may include, but is not limited to, a smartphone, tablet, laptop, monitor, tablet, and the like. The display device may include a separate device that includes a transparent screen configured to display computer-generated images and/or information. In some cases, GUI 172 may be displayed on a plurality of display devices. In some cases, GUI 172 may contain one or more interaction components. "Interaction component" for the purposes of this disclosure is a device or a computer program that is capable of allowing a user to interact with GUI 172. Interaction component may include a button or similar clickable elements wherein the clicking of the button may initiate a response or a command. In some cases, the interaction component may allow a user to select a specific recommendation within outreach recommendations. In some cases, interaction component may include a comment box to allow a user to input data such as user data 116. In some cases, the comment box may be used to provide feedback to computing device 104. For example, a user may provide feedback that a particular score or a particular outreach index 140 was not accurate after a communication was made with a target. In some cases, the interaction component may include multiple checkboxes on a display, wherein the clicking of a checkbox may indicate to computing device 104 that a specific suggestion within outreach recommendation 152 was chosen. This may indicate to computing device 104 the particular suggestion that was used and the result of the following conversation. Interaction components may further contain drop-down menus where a user may choose from a list of commands wherein the list of commands may perform different functions. For example, a command may include pausing or stopping the data that is being displayed. In some cases, a command may allow the user to process another iteration or go back and input more data. Interaction features may further include dialog or comment boxes wherein users may enter comments about data that is displayed. Comment boxes may be consistent with user input 176 as described. In some cases, the interaction component may allow a user to provide feedback on potential data 120 generated by computing device 104, calculated outreach indexes, and the resulting outreach recommendation 152. In some cases, a user may 'go back' in order to alter data such as potential data 120 generated by computing device 104 that may have been inaccurate. User may instead input or correct data within potential data 120 in order to receive better results. In some cases, interaction components may allow a users to generate "predictive" outreach recommendations wherein the predictive outreach recommendations would include suggestions following a possible event. For example, a user may input data into potential data 120 indicating a possible event that has not yet occurred in order to determine what predictive recommendations might be made. Other interaction components properties may include, without limitation, color, content, function, animation, and the like thereof.

With continued reference to FIG. 1, interaction component may include a resulting questionnaire asking a user to create their experience. The questionnaire may include questions such as, "Did the target answer?", "was a voicemail left and what was said?", "How was the voicemail" returned?", "how many attempts were made through a particular mode of communication?", "if contact was made, how would you rate the experience?". Inputs from users may be used for any machine learning model described herein.

With continued reference to FIG. 1, interaction components may include user input 176 asking whether the user interacted with the target. If a user did not interact with the target, computing device 104 may generate alternative outreach recommendation 152 such that a user can reach out again in the near future. In some cases, the interaction component may include user input 176 asking whether each set of data described in this disclosure was accurate, wherein machine learning models described herein may be trained for future iterations. In some cases, computing device 104 may ask to follow-up question through interaction components in order to determine how a particular experience went in order to provide better suggestions for future iterations. In some cases, GUI 172 may further be configured to receive user feedback wherein user feedback may be used to train any machine learning model described herein. User feedback may be inputted in the form of a survey asking users to rate each data generated by computing device 104. User feedback may further include checkboxes associated with a particular data or a particular element within a particular data wherein the selection of a checkbox may indicate that a particular data or element was not relevant or did not work. User feedback may be used for future iterations.

With continued reference to FIG. 1, apparatus 100 may be configured as a stand alone product or an add-on or a plug-in to existing software. For example, apparatus may be configured as an add-on to an existing software utilized by the user such as, and without limitation, financial software, software related to a particular entity, software utilized for selling goods or services, software related to internet browsing, and the like. In some cases, software from the apparatus may be incorporated into existing software wherein a user may interact with apparatus 100 while using another software. In some cases, the add-on or plug-in may allow for easier transportation of data such as user data, potential data 120, and the like.

Figure 2:
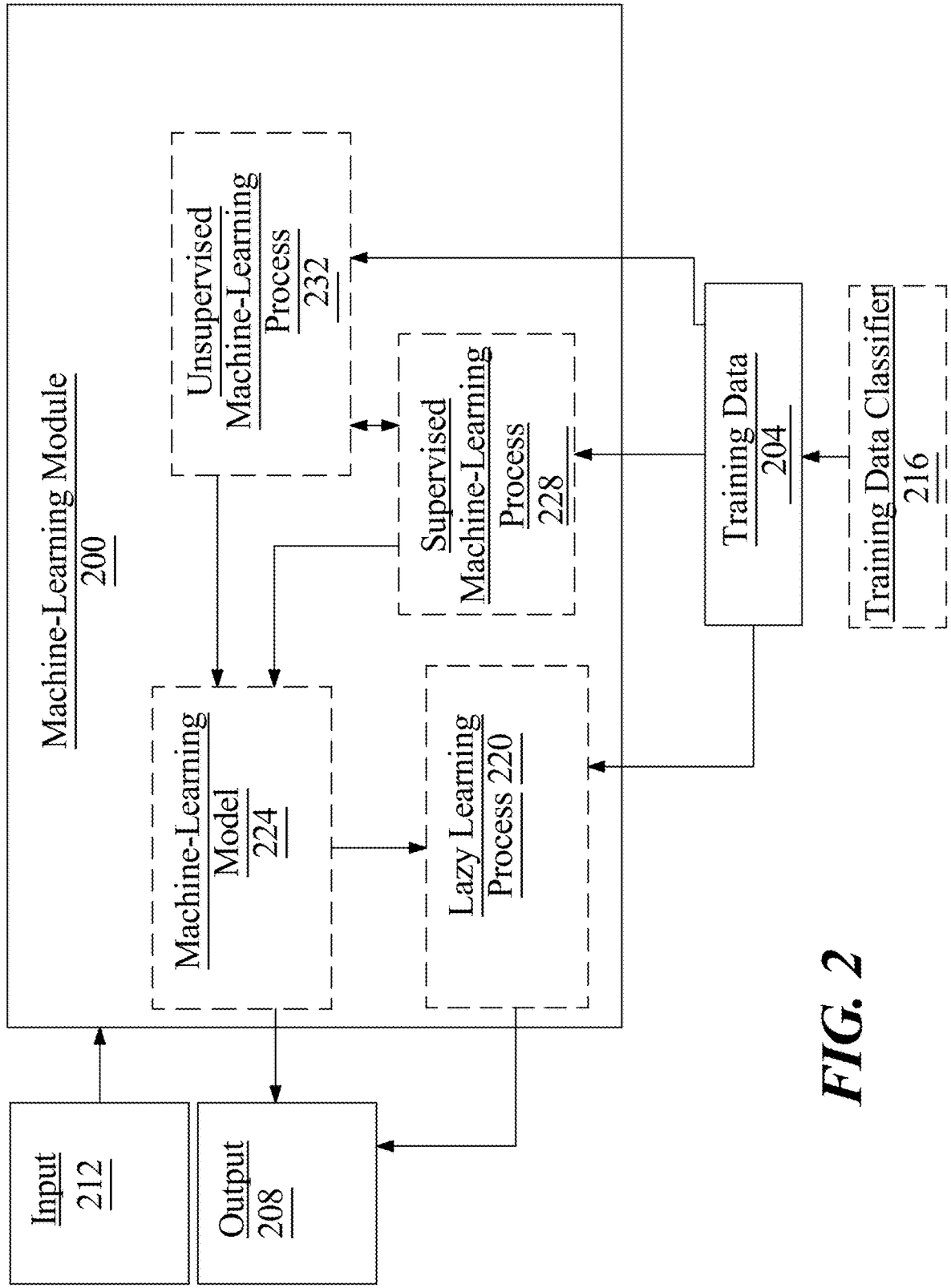
FIG. 2 is a block diagram of an exemplary embodiment of a machine learning module.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance, by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, database, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation, a training data classifier 216. Training data classifier 216 may include a "classifier," which, as used in this disclosure, is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device, and/or any module and/or component operating thereon, derives a classifier from training data 204. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or any other neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristics may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include potential data as described above as inputs, outreach index as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for the development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithms may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbor algorithms. Machine-learning algorithms may include various forms of latent space regularization, such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
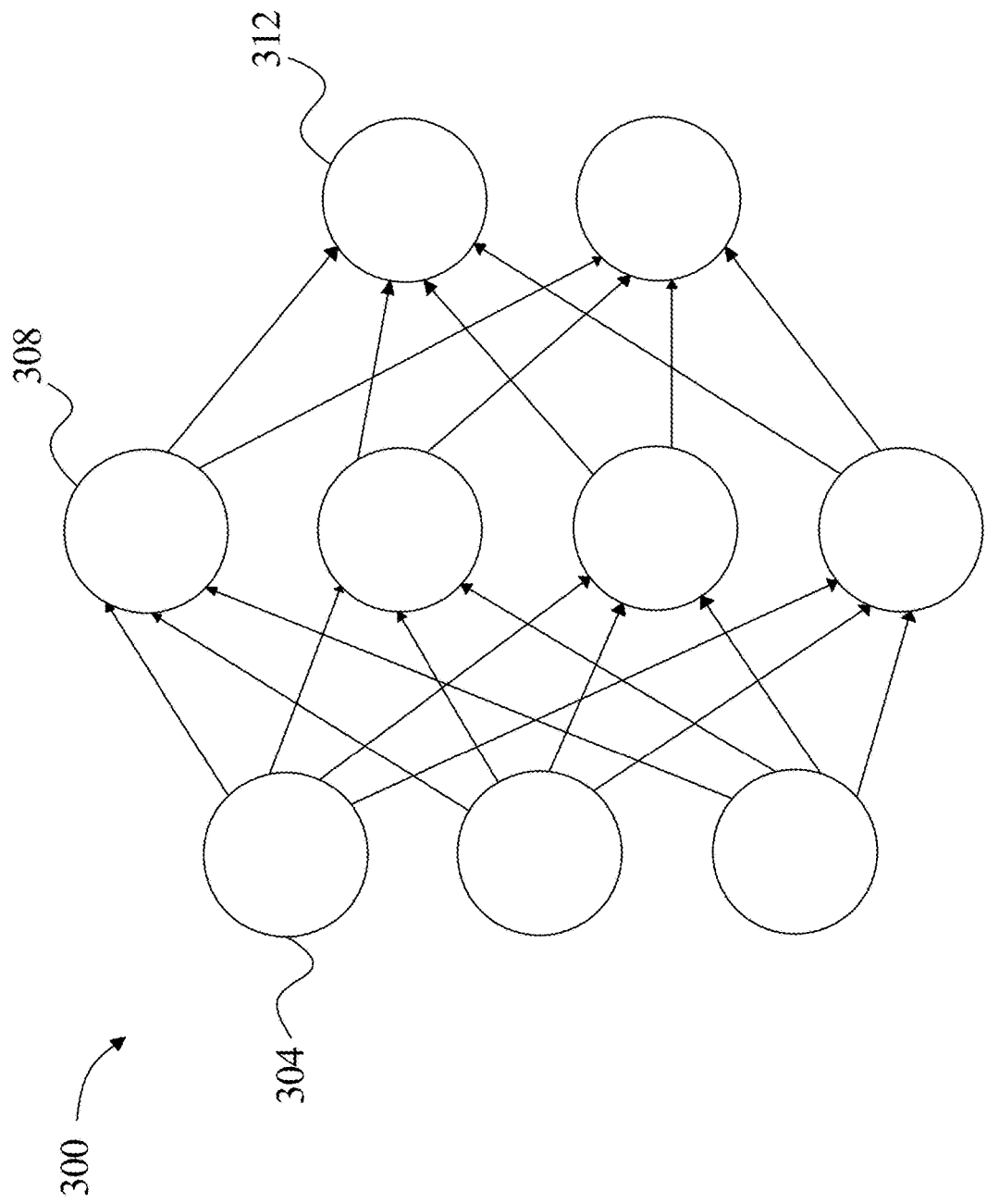
FIG. 3 is a diagram of an exemplary embodiment of a neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as, without limitation, a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
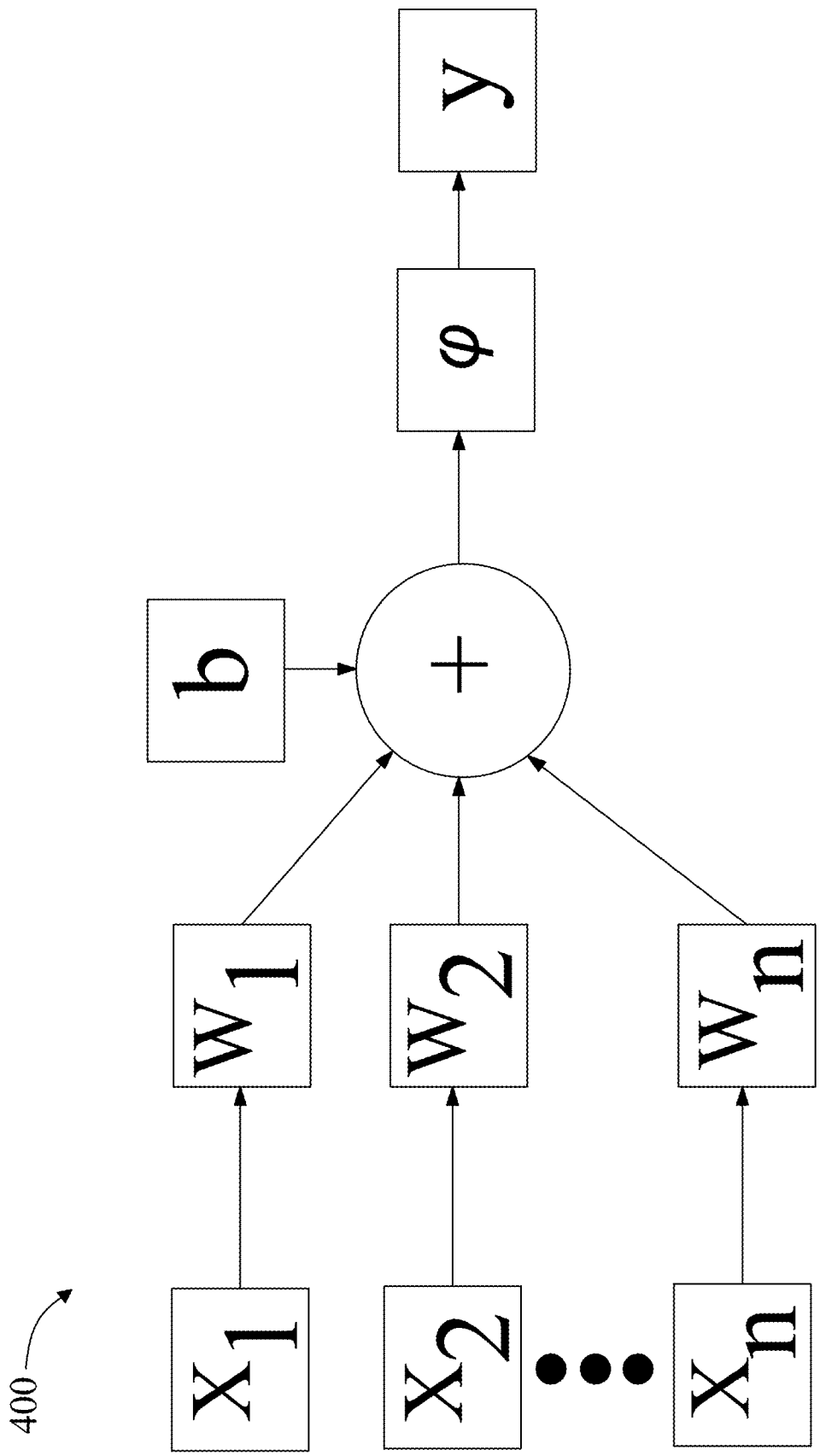
FIG. 4 is a block diagram of an exemplary embodiment of a node.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
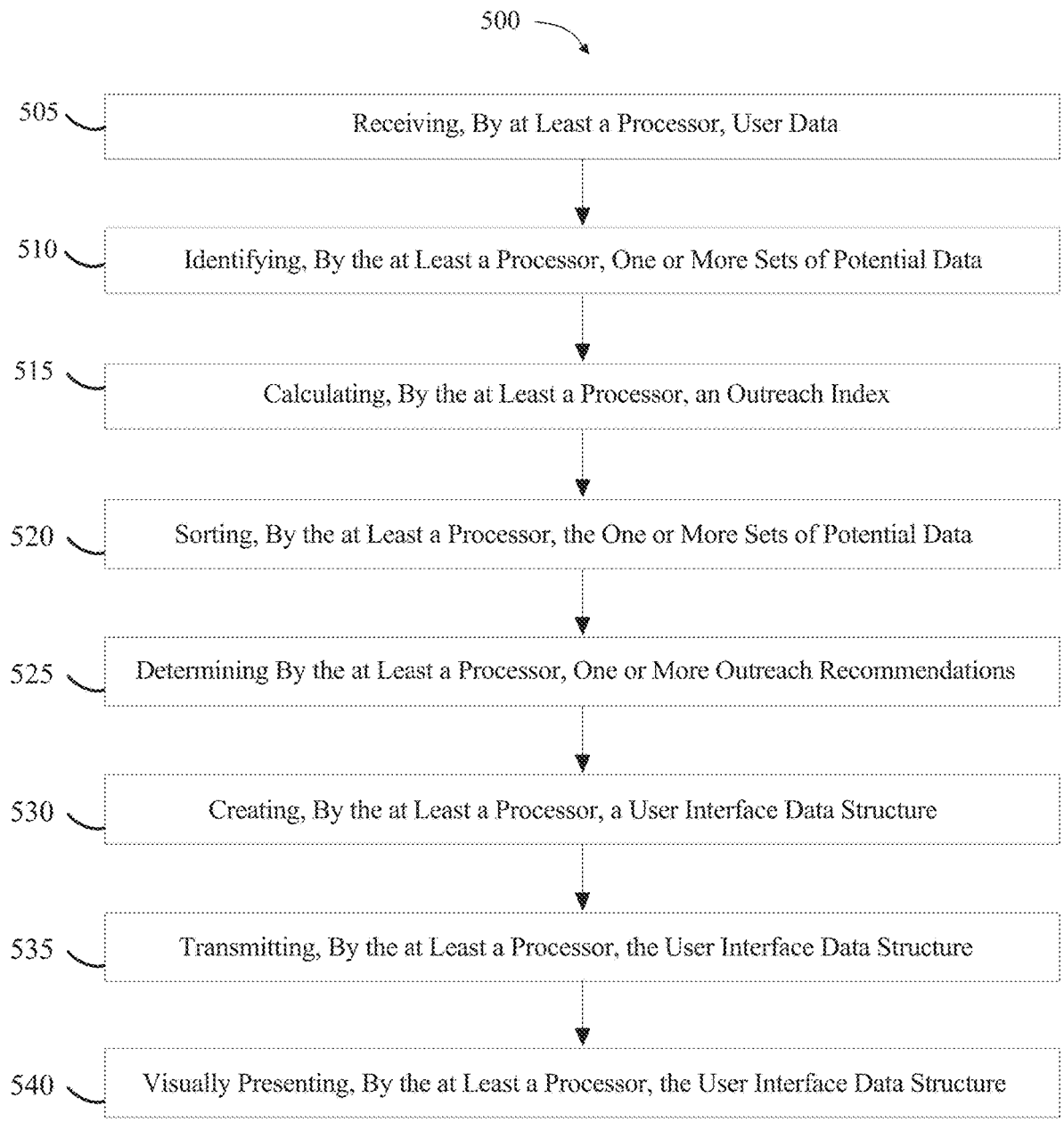
FIG. 5 is a flow diagram illustrating an exemplary embodiment of a method for enhanced outreach.

Referring now to FIG. 5, a method 500 for enhanced outreach is described. At step 505 method 500 includes receiving, by the at least a processor, user data. This step may be implemented as described above with reference to FIGS. 1-5, without limitation.

With continued reference to FIG. 5, at step 510, method 500 includes identifying, by the at least a processor, one or more sets of potential data associated with a potential target as a function of user data. In some cases, identifying, by at least a processor, one or more sets of potential data further includes identifying, by at least a processor, one or more sets of potential data using a web crawler. In some cases, identifying, by the at least a processor, one or more sets of potential data associated with a potential target further includes identifying, by the at least a processor, one or more sets of potential data as a function of user data. In some cases, identifying, by the at least a processor, one or more sets of potential data further includes receiving, by the at least a processor, a plurality of previous potential targets from a database. In some cases, identifying, by the at least a processor, one or more sets of potential data further includes classifying, by the at least a processor, the plurality of previous potential targets to a field class, and identifying, by the at least a processor one or more sets of potential data as a function of classifying the plurality of previous potential targets to the field class. In some cases, potential data includes entity data. This step may be implemented as described above with reference to FIGS. 1-5, without limitation.

With continued reference to FIG. 5, at step 515, method 500 includes calculating, by the at least a processor, one or more outreach indexes as a function of the potential data. In some cases, calculating outreach index may include receiving an indicator weighting associated with at least one element within the one or more sets of potential data and calculating the outreach index as a function of the indicator weighting. Receiving indicator weighting may include receiving, by the at least a processor, outreach training data including a plurality of potential data correlated to a plurality of indicator weightings. Additionally, or alternatively, calculating an outreach index may include training, by at least a processor, an outreach machine learning model as a function of the outreach training data. Additionally or alternatively, receiving indicator weighting may include receiving, by at least a processor, indicator weighting as a function of the outreach machine learning model. In some cases wherein training, by at least a processor, the outreach machine learning model as a function of the potential data includes receiving, by at least a processor, user input as a function of the outreach index. This step may be implemented as described above with reference to FIGS. 1-5, without limitation.

With continued reference to FIG. 5, at step 520, method 500 includes sorting, by the at least a processor, the one or more sets of potential data as a function of the outreach indexes. This step may be implemented as described above with reference to FIGS. 1-5, without limitation.

With continued reference to FIG. 5, at step 525 method 500 includes determining, by the at least a processor, one or more outreach recommendations as a function of the one or more outreach indexes and the one or more sets of potential data. In some cases, wherein the outreach recommendation includes an outreach channel. In some cases, wherein determining, by the at least a processor, outreach recommendation as a function of the outreach index and the potential data includes receiving, by the at least a processor, recommendation training data comprising a plurality of outreach indexes and a plurality of potential data correlated to a plurality of outreach recommendations. Additionally, or alternatively, determining an outreach recommendation includes training, by the at least a processor, a recommendation machine learning model as a function of the recommendation training data. Additionally, or alternatively, determining an outreach recommendation includes calculating, by the at least a processor, an outreach recommendation as a function of the recommendation machine learning model. In some cases, determining, by the at least a processor, an outreach channel comprises classifying, by the at least a processor, potential data to a demographic class and determining, by the at least a processor, an outreach channel as a function of the classifying the potential data. This step may be implemented as described above with reference to FIGS. 1-5, without limitation.

With continued reference to FIG. 5, at step 530, method 500 includes creating, by the at least a processor, a user interface data structure, wherein the user interface data structure comprises the one or more outreach recommendations. This step may be implemented as described above with reference to FIGS. 1-5, without limitation.

With continued reference to FIG. 5, at step 535, method 500 includes transmitting, by the at least a processor, the user interface data structure to a graphical user interface. This step may be implemented as described above with reference to FIGS. 1-5, without limitation.

With continued reference to FIG. 5, at step 540, method 500 includes visually presenting, by the at least a processor, the user interface data structure as a function of the graphical user interface. This step may be implemented as described above with reference to FIGS. 1-5, without limitation.

With continued reference to FIG. 5, method 500 may further include creating, by the at least a processor, a user interface data structure, wherein the user interface data structure comprises the outreach recommendation. Method 500 may further include transmitting, by the at least a processor, the user interface data structure to a graphical user interface (GUI) communicatively connected to the at least a processor. The GUI may be configured to receive the user interface data structure and display the outreach recommendation as a function of the user interface data structure. In some cases, method 500 further comprises, receiving by the at least a processor, user feedback through the GUI. In some cases, method 500 includes creating, by the at least a processor, a user interface data structure, wherein the user interface data structure includes the one or more outreach recommendations, transmitting, by the at least a processor, the user interface data structure to a graphical user interface and visually presenting, by the at least a processor, the user interface data structure as a function of the graphical user interface. In some cases, visually presenting, by the at least a processor, the user interface data structure as a function of the graphical user interface includes visually presenting, by the at least a processor, the user interface data structure through an existing software. This step may be implemented as described above with reference to FIGS. 1-5, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, a wearable device such as a virtual reality headset or an augmented reality headset, and any combinations thereof. In one non-limiting example, a computing device may include and/or be included in a kiosk.

Figure 6:
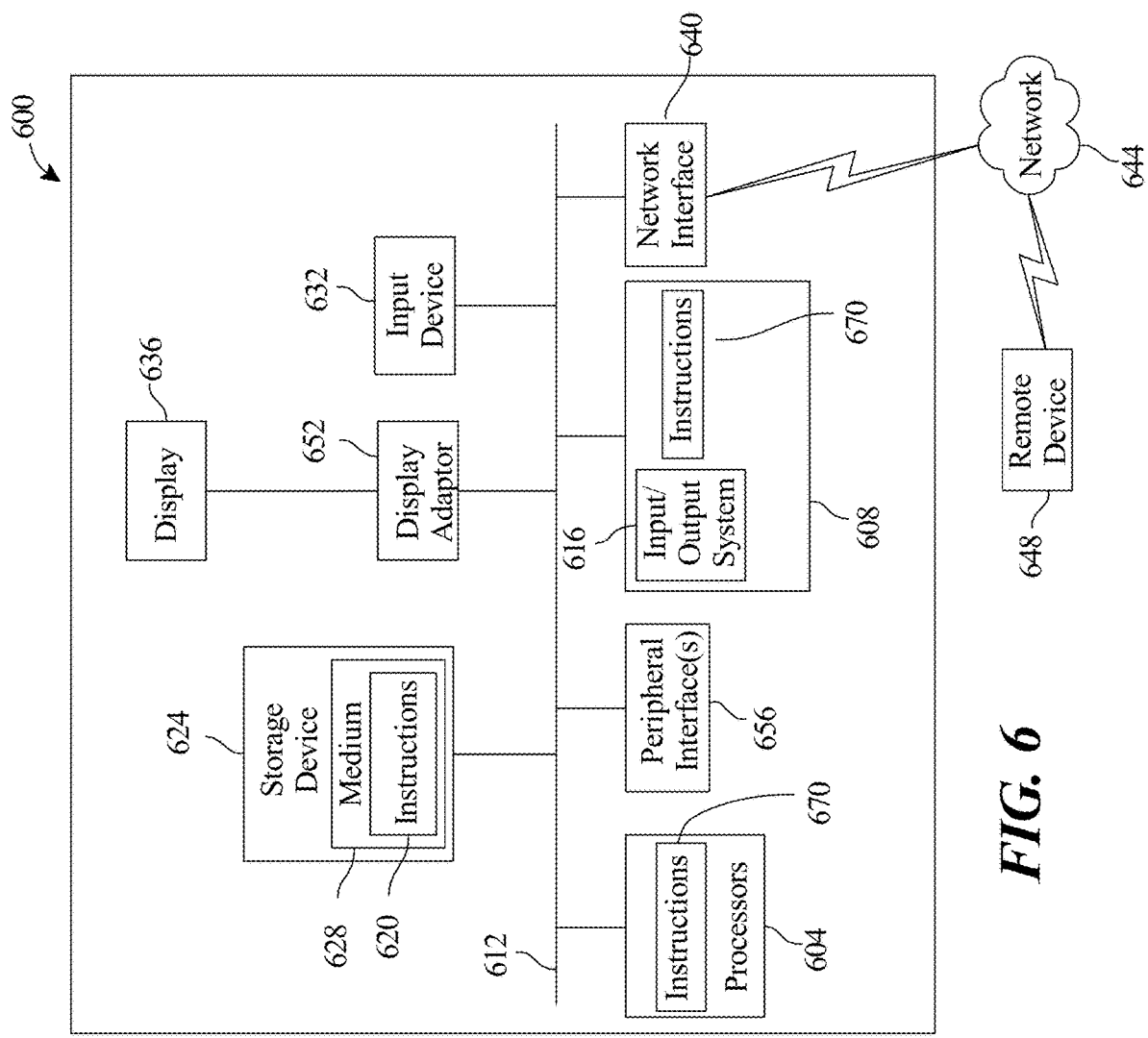
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include one or more input devices 632. In one example, a user of computer system 600 may enter commands and/or other information into computer system 600 via input device 632. Examples of an input device 632 include but are not limited to, an alpha-numeric input device (e.g., a keyboard), a pointing device, a mouse, a trackpad, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, a head mounted display for virtual reality, a head mounted display for augmented reality, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, a head mounted display (HMD), and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for enhanced outreach, the apparatus comprising:
    at least a processor; and
    a memory communicatively connected to the at least a processor, the memory containing instructions configuring the at least a processor to:
        receive user data;
        identify one or more sets of potential data as a function of the user data, wherein each set of potential data of the one or more sets of potential data is associated with a potential target;
        calculate one or more outreach indexes as a function of the one or more sets of potential data, wherein calculating further the one or more outreach indexes further comprises:
            receiving at least one indicator weighting associated with at least one element within the one or more sets of potential data; and
            calculating the one or more outreach indexes as a function of the at least one indicator weighting;
        sort the one or more sets of potential data as a function of the one or more outreach indexes;
        determine one or more outreach recommendations as a function of the one or more outreach indexes and the one of more sets of potential data, wherein:
            the one or more outreach recommendations comprises suggestions instructing a user on how to communicate with the potential target and an outreach channel, wherein the outreach channel comprises a suggested mode of communication with the potential target; and
            determining the one or more outreach recommendations comprises:
                receiving recommendation training data comprising a plurality of outreach indexes and a plurality of potential data correlated to a plurality of outreach recommendations; and
                training a recommendation machine learning model as a function of the recommendation training data, wherein training further comprises:
                    receiving user feedback on an outreach recommendation, and
                    iteratively training the recommendation machine learning model on the feedback correlated to the outreach recommendation:
        create a user interface data structure, wherein the user interface data structure comprises the one or more outreach recommendations;
        transmit the user interface data structure to a graphical user interface; and
        visually present the user interface data structure as a function of the graphical user interface.

2. The apparatus of claim 1, wherein receiving the at least one indicator weighting associated with the at least one element comprises:
    receiving outreach training data comprising a plurality of potential data correlated to a plurality of indicator weightings;
    training an outreach machine learning model as a function of the outreach training data; and
    receiving the at least one indicator weighting as a function of the outreach machine learning model.

3. The apparatus of claim 1, wherein identifying the one or more sets of potential data further comprises identifying the one or more sets of potential data using a web crawler.

4. The apparatus of claim 1, wherein the one or more sets of potential data comprises entity data.

5. The apparatus of claim 1, wherein determining the one or more outreach recommendations as a function of the one or more outreach indexes and the one or more sets of potential data comprises:
    receiving recommendation training data comprising a plurality of outreach indexes and a plurality of potential data correlated to a plurality of outreach recommendations;
    training a recommendation machine learning model as a function of the recommendation training data; and
    calculating the one or more outreach recommendations as a function of the recommendation machine learning model.

6. The apparatus of claim 1, wherein the apparatus is configured as an add-on to an existing software.

7. The apparatus of claim 1, wherein determining the outreach channel comprises classifying potential data to a demographic class and determining the outreach channel as a function of the classified potential data.

8. The apparatus of claim 1, wherein identifying the one or more sets of potential data further comprises receiving a plurality of previous potential targets from a database.

9. The apparatus of claim 8, wherein identifying the one or more sets of potential data further comprises:
 classifying the plurality of previous potential targets to a field class; and
 identifying the one or more sets of potential data as a function of classifying the plurality of previous potential targets to the field class.

10. A method for enhanced outreach, the method comprising:
 receiving, by at least a processor, user data;
 identifying, by the at least a processor, one or more sets of potential data as function of the user data, wherein each set of the one or more sets is associated with a potential target;
 calculating, by the at least a processor, one or more outreach indexes as a function of the one or more sets of potential data comprising:
  receiving at least one indicator weighting associated with at least one element within the one or more sets of potential data; and
  calculating the one or more outreach indexes as a function of the at least one indicator weighting;
 sorting, by the at least a processor, the one or more sets of potential data as a function of the one or more outreach indexes;
 determining, by the at least a processor, one or more outreach recommendations as a function of the one or more outreach indexes and the one or more sets of potential data, wherein:
  the one or more outreach recommendations comprise suggestions instructing a user on how to communicate with the potential target and an outreach channel, wherein the outreach channel comprises a suggested mode of communication with the potential target; and
  determining the one or more outreach recommendations comprises:
   receiving recommendation training data comprising a plurality of outreach indexes and a plurality of potential data correlated to a plurality of outreach recommendations; and
   training a recommendation machine learning model as a function of the recommendation training data, wherein training the recommendation machine learning model comprises:
    receiving user feedback on an outreach recommendation, and
    iteratively training the recommendation machine learning model on the feedback correlated to the outreach recommendation;
 creating, by the at least a processor, a user interface data structure, wherein the user interface data structure comprises the one or more outreach recommendations;
 transmitting, by the at least a processor, the user interface data structure to a graphical user interface; and
 visually presenting, by the at least a processor, the user interface data structure as a function of the graphical user interface.

11. The method of claim 10, wherein receiving the at least one indicator weighting associated with the at least one element comprises:
 receiving outreach training data comprising a plurality of potential data correlated to a plurality of indicator weightings;
 training an outreach machine learning model as a function of the outreach training data; and
 receiving the at least one indicator weighting as a function of the outreach machine learning model.

12. The method of claim 10, wherein identifying, by the at least a processor, the one or more sets of potential data further comprises identifying, by the at least a processor, the one or more sets of potential data using a web crawler.

13. The method of claim 10, wherein the one or more sets of potential data comprises entity data.

14. The method of claim 10, wherein determining, by the at least a processor, the one or more outreach recommendations as a function of the one or more outreach indexes and the one or more sets of potential data comprises:
 receiving, by the at least a processor, recommendation training data comprising a plurality of outreach indexes and a plurality of potential data correlated to a plurality of outreach recommendations;
 training, by the at least a processor, a recommendation machine learning model as a function of the recommendation training data; and
 calculating, by the at least a processor, the one or more outreach recommendations as a function of the recommendation machine learning model.

15. The method of claim 10, wherein visually presenting, by the at least a processor, the user interface data structure as a function of the graphical user interface comprises visually presenting, by the at least a processor, the user interface data structure through an existing software.

16. The method of claim 10, wherein determining, by the at least a processor, the outreach channel comprises classifying, by the at least a processor, potential data to a demographic class and determining, by the at least a processor, the outreach channel as a function of the classified potential data.

17. The method of claim 10, wherein identifying, by the at least a processor, the one or more sets of potential data further comprises receiving, by the at least a processor, a plurality of previous potential targets from a database.

18. The method of claim 17, wherein identifying, by the at least a processor, the one or more sets of potential data further comprises:
 classifying, by the at least a processor, the plurality of previous potential targets to a field class; and
 identifying, by the at least a processor, the one or more sets of potential data as a function of classifying the plurality of previous potential targets to the field class.

\* \* \* \* \*